US010982827B2

(12) United States Patent
Cheng

(10) Patent No.: US 10,982,827 B2
(45) Date of Patent: Apr. 20, 2021

(54) MODULAR ASSEMBLED OUTDOOR LIGHTING DEVICE AND INSTALLATION METHOD THEREOF, LIGHT POLE STRUCTURE

(71) Applicant: Zhejiang Hoolink Technology Co., Ltd., Hangzhou (CN)

(72) Inventor: Shiyou Cheng, Hangzhou (CN)

(73) Assignee: Zhejiang Hoolink Technology Co., Ltd.

(*) Notice: Subject to any disclaimer, the term of this patent is extended or adjusted under 35 U.S.C. 154(b) by 0 days.

(21) Appl. No.: 16/857,231

(22) Filed: Apr. 24, 2020

(65) Prior Publication Data
US 2021/0025554 A1 Jan. 28, 2021

(30) Foreign Application Priority Data
Jul. 27, 2019 (CN) .......................... 201910685606.6

(51) Int. Cl.
*F21S 2/00* (2016.01)
*F21S 6/00* (2006.01)
(Continued)

(52) U.S. Cl.
CPC ............... *F21S 2/005* (2013.01); *F21S 6/005* (2013.01); *F21V 21/088* (2013.01);
(Continued)

(58) Field of Classification Search
CPC .. F21S 2/005; F21S 6/005; F21S 8/086; F21S 8/085; F21V 23/003; F21V 21/0824;
(Continued)

(56) References Cited

U.S. PATENT DOCUMENTS 3,369,331 A * 2/1968 Deskey ................... E04H 12/08
52/38
4,200,904 A * 4/1980 Doan ....................... F21S 9/043
362/183
(Continued)

FOREIGN PATENT DOCUMENTS

CN 102506360 A 6/2012
CN 204665183 U 9/2015
(Continued)

OTHER PUBLICATIONS

CN 108343935, Jul. 31, 2018 , Wang English Translation (Year: 2018).*
(Continued)

*Primary Examiner* — Peggy A Neils
(74) *Attorney, Agent, or Firm* — Fresh IP PLC; Clifford D. Hyra; Aubrey Y. Chen

(57) ABSTRACT

Disclosed is a modular assembled outdoor lighting device and an installation method thereof, light pole structure. It includes a base, a main pole, a lamp, a function device fixedly connected to the main pole, and an auxiliary pole fixedly connected to the top of the main pole. At least one concave or convex mounting surface is provided on the outer edge of the auxiliary pole, the lamp is fixedly connected to the mounting surface, the base is fixedly connected to the bottom of the main pole, and at least one outer surface of the main pole is provided with a mounting groove, and a fixing member is embedded in the mounting groove. A module board, as a spliced structure, is sleeved on the outer edge of the main pole. The module board includes at least one daughter board and/or at least one mother board fixedly connected to the fixing member.

16 Claims, 25 Drawing Sheets

(51) Int. Cl.
*F21V 21/08* (2006.01)
*F21V 21/14* (2006.01)
*F21V 23/00* (2015.01)
*F21V 21/088* (2006.01)
*F21W 131/10* (2006.01)

(52) U.S. Cl.
CPC .......... *F21V 21/0824* (2013.01); *F21V 21/14* (2013.01); *F21V 23/003* (2013.01); *F21W 2131/10* (2013.01)

(58) Field of Classification Search
CPC .......... F21V 21/14; F21V 21/21; F21V 21/22; F21V 21/088; F21V 21/116; F21W 2131/10; F21W 2131/103
See application file for complete search history.

(56) References Cited

U.S. PATENT DOCUMENTS

| | | | | |
|---|---|---|---|---|
| 6,784,357 | B1* | 8/2004 | Wang | F21S 8/086 136/244 |
| 6,962,314 | B2* | 11/2005 | Hsu | F04D 29/601 248/205.5 |
| 7,886,492 | B2* | 2/2011 | Kelly | E01F 9/681 52/297 |
| 10,641,302 | B1* | 5/2020 | Huffman | F16S 3/00 |
| 2006/0012978 | A1* | 1/2006 | Allsop | F21S 6/004 362/183 |
| 2007/0159836 | A1* | 7/2007 | Huang | F21V 21/0824 362/431 |
| 2020/0103085 | A1* | 4/2020 | Chia | E04C 3/36 |

FOREIGN PATENT DOCUMENTS

| | | | | |
|---|---|---|---|---|
| CN | 205279007 | U | 6/2016 | |
| CN | 108343935 | * | 7/2018 | ............. F21V 21/22 |

OTHER PUBLICATIONS

CN 108343935, Jul. 31, 2018, Wang Bibliographic Information (Year: 2018).*

CN 108343935, Jul. 31, 2018, Wang, Drawings for Chinese patent (Year: 2018).*

* cited by examiner

MODULAR ASSEMBLED OUTDOOR LIGHTING DEVICE AND INSTALLATION METHOD THEREOF, LIGHT POLE STRUCTURE

TECHNICAL FIELD

The present disclosure relates to the technical field of outdoor lighting device, in particular to a modular assembled outdoor lighting device and an installation method thereof, a light pole structure.

BACKGROUND

Urban lighting facilities are indispensable infrastructures for a city, and play a vital role in the safety of vehicles and pedestrians on urban roads. Street light poles are necessary basic members of outdoor lighting device. Street light poles seem simple, in fact, a great deal of attention should be paid on them. First of all, it is the safety after installation, secondly, the convenience of maintenance needs to be considered. If it can be easily replaced, then the aesthetics of the street lights will be taken into account. The street lights of a city often reflect the characteristics and style of the city. However, with the development of society and the advancement of urbanization, people's demand for outdoor lamps no longer meets only a single lighting function, and higher requirements, such as the additional functions, shapes, and other aspects of outdoor lamps, are also put on.

At present, most of the outdoor lamps on the market have a single shape and function, and the installation and wiring of the lamp head and other functions are old and tedious. After that, it is inconvenient to add other functions, the fixing method is rough and unattractive, and the device maintenance is not convenient.

SUMMARY

An object of the present disclosure is to provide a modular assembled outdoor lighting device and a light pole structure.

The technical solution of the present disclosure is: a modular assembled outdoor lighting device may include: a main pole and a function device, the main pole is provided with a mounting groove at least one outer surface; a fixing member embedded in the mounting groove; and a module board sleeved on an outer edge of the main pole, the module board may include at least one daughter board and/or at least one mother board, the module board is fixedly connected to the fixing member, the function device is fixedly connected to the main pole, and the module board and/or the main pole is embedded with a preset interface.

In the aforementioned modular assembled outdoor lighting device, it may further include an auxiliary pole fixedly connected to a top of the main pole, and the auxiliary pole is provided with at least one concave or convex mounting surface at its outer edge; the auxiliary pole is installed with a lamp, and the main pole is fixedly connected with a base at its bottom.

In the aforementioned modular assembled outdoor lighting device, wherein a cross section of the main pole may be a polygonal structure, and the polygonal structure is selected from a group consisting of a regular octagon, a regular hexagon and a square, inner chambers of the main pole and the auxiliary pole are isolated to form two or more independent chambers.

In the aforementioned modular assembled outdoor lighting device, wherein a cross section of the module board is a circular or a polygonal structure, and the polygonal structure is selected from a group consisting of a regular octagon, a regular hexagon, and a square.

In the aforementioned modular assembled outdoor lighting device, wherein a cross section of the mounting groove is a T-shaped structure, and the fixing member is provided with a fixing seat externally protruded at a middle portion of the fixing member; the fixing seat is provided with a slot on an inner end surface, and a spring is embedded in the slot, and a compression direction of the spring is perpendicular to the end surface of the slot, and a threaded hole is provided at middle of the fixing seat, the threaded hole is aligned with the spring, the fixing seat is provided with limit plate at both sides.

In the aforementioned modular assembled outdoor lighting device, wherein the fixing member may include a bolt, and the bolt sequentially penetrates the module board, the threaded hole and the spring, and the bolt is threadedly connected to the threaded hole.

In the aforementioned modular assembled outdoor lighting device, wherein the function device may include a wind direction and speed detection device, a camera device, a display device, a broadcast device, a traffic warning sign device and a control box device, the function device is fixedly connected to a module board or to the fixing member.

In the aforementioned modular assembled outdoor lighting device, wherein the preset interface may include an insertion portion, an external portion, and an end cover, the inserting portion is inserted into the main pole, an outer wall of the inserting portion is sealedly connected to the main pole, the front end of the inserting portion is fixedly connected to a wire tube, the external portion is fixedly connected to a rear end of the insertion portion, the external portion is threadedly connected to the end cover, the external portion is provided with a cavity provided with a wire groove at a bottom of the cavity, the wire groove is in communication with the wire tube.

A method for installing a modular assembled outdoor lighting device, wherein it may include a step of installing the lamp and a step of reservation of the fixing member, a step of installation of the module board, and a step of installation of the function device;

the step of installation of the lamp may include:
determining an installation direction and an installation height firstly;
selecting a suitable auxiliary pole and a specific installation surface;
installing the lamp on the installation surface by means of bolts;

the step of reservation of fixing member may include:
determining an installation plan firstly, and marking in advance at the position to be installed;
pressing the fixing member at the marked position,
and the step of pressing the fixing member may be:
placing one side of the spring toward the mounting groove, and placing the limit plate parallel to the extending direction of the mounting groove, and finally pressing the fixing member into the mounting groove until the spring is fully compressed; releasing the spring after rotating the fixing member by 90 degrees, and the limit plate is pressed by the spring to tightly adhere to the inner wall of the mounting groove;
at this time, the fixing member is reserved at a fixed position, and the fixed position is the installation interface.

the step of installation of module board may be:
providing with a fixing hole on the end surface of the module board before installing the module board;

connecting the module board to the fixing member;

passing the bolts sequentially through the module board, the threaded hole and the spring, and tightening them;

the step of installation of the function device may be:

connecting the function device directly to the module board.

In the aforementioned method for installing a modular assembled outdoor lighting device, wherein: the step of installing the function device may be further: firstly presetting a through port on the module board, the through port is directly opposite the mounting groove, and then fixing the function device to the mounting groove by using a fixing member.

The present disclosure provides a snap slot type modular smart light pole structure, wherein it may include a light pole and a function module, the light pole and the function module may be fixedly connected through a connecting member; the light pole and the connecting member may be fixedly connected by a T-shaped nut provided with an elastic member; and the light pole is provided with an isolation assembly, the light pole can be separated by the isolation assembly into an independent chamber; the light pole may be provided with a preset interface on a side wall, the preset interface can be provided with a waterproof pad connected with the connecting member.

In the aforementioned the snap slot type modular smart light pole structure, wherein the function module may include an AP module, a lamp head module, and a wind direction and wind speed detection module, a camera module, a display module, a broadcast module, a traffic warning sign module and a control box module.

In the aforementioned the snap slot type modular smart light pole structure, wherein the connecting member may include a snap ring and a mounting plate, the snap ring may have a cross-section of a semi-circular structure, the mounting plate may be fixedly installed at middle of the snap ring, a joint between the mounting plate and the snap ring can be embedded with a seal pad.

In the aforementioned the snap slot type modular smart light pole structure, wherein a body of the light pole can be an octagonal tube structure, and the light pole may be provided with four arc-shaped plates protruding outward and extending to both sides at intervals at a side, the arc-shaped plates and the light pole can be integrated, and at least one snap slot can be formed between adjacent two of the arc-shaped plates. In one specific embodiment, 2 or 4 or 6 or 8 snap slots will be formed between any adjacent two of the arc-shaped plates.

In the aforementioned the snap slot type modular smart light pole structure, wherein the T-shaped nut may include a nut post and a nut seat, and the nut post may be fixedly connected to one end surface of the nut seat, the nut post and the nut seat may be integrated, the elastic member can be a spring leaf fixed on the nut seat on the end surface facing away from the nut post by a screw.

In the aforementioned the snap slot type modular smart light pole structure, wherein the nut seat may be a rectangular structure, and the nut seat can be provided with two arc chamfers located on opposite corners of the nut seat.

In the aforementioned the snap slot type modular smart light pole structure, wherein the isolation assembly may include three rectangular tubes welded in sequence, and the isolation assembly can be provided with a wiring slot.

In the aforementioned the snap slot type modular smart light pole structure, wherein the preset interface may include a connecting pipe, a fixing seat, and an end cover; the connecting pipe can penetrate an outer side wall of the light pole, the fixing seat may be connected to an outside of the connecting pipe, and a waterproof pad can be embedded between the fixing seat and the outer side wall of the light pole.

The present disclosure provides a method for using a snap slot type modular smart light pole structure, it may include a pre-installation stage and a substantial installation stage; wherein the pre-installation stage may include the following steps:

Step 1: Planning the type of the function modules and the specific mounting position of the function modules, customizing the isolation assembly according to the mounting position, and fixing the isolation assembly into the light pole;

Step 2: Arranging the preset interface at the specified position according to the planning in step 1;

Step 3: Presetting the T-shaped nut in the snap slot on the light pole when referring to the position of the preset interface. Specifically, the T-shaped nut can be placed vertically into the snap slot. When placing, the nut seat is parallel to the inner side of the snap slot. The spring leaf is in contact with the inner side of the snap slot. Then the spring leaf can be pressed inward and the nut seat may be rotated by 90 degrees clockwise. Pressing the spring leaf slightly, and sliding the T-shaped nut as a whole up and down, the appropriate position is will be reached. Finally, the spring leaf can be loosened and fixed by the elasticity of the spring leaf and its own friction.

Step 4: Fixing the snap ring to the planned position in step 1 with T-shaped nuts, preparing the corresponding function module, and finally entering the actual installation stage.

The actual installation stage may include the following steps:

Step S1: Matching the function module with the corresponding mounting position according to the plan of step 1.

Step S2: Leading out the strong and weak wires through the preset interface, and connecting the strong and weak wires into the function module;

Step S3: Fixing the function module with the mounting plate on the snap ring to complete the installation on the light pole, after the function module has completed the line connection.

In the above-mentioned method for using a snap slot type modular smart light pole structure, step 1 in the pre-installation stage may further include planning an extension mounting position, and in step S1 in the substantial installation stage, it is necessary to check the preset interface on the extension mounting position for water resistance.

The present disclosure has the advantages of:

1. designing a new snap slot type light pole structure, and the connecting members matched with it to realize the modular installation of function equipment;

2. the entire smart light pole being a combined assembly structure, which can achieve the purpose of quick assembly, quick disassembly, and quick maintenance;

3. reserving the extension interface in advance and connect the cable in advance, so that other function devices can be added arbitrarily in the later stage to achieve a high degree of integration of smart light poles;

4. ensuring that the surface of the main body of the light pole is not lower than IP65 (the protection level against the invasion of foreign objects by the enclosure of electrical equipment).

Figure 1:
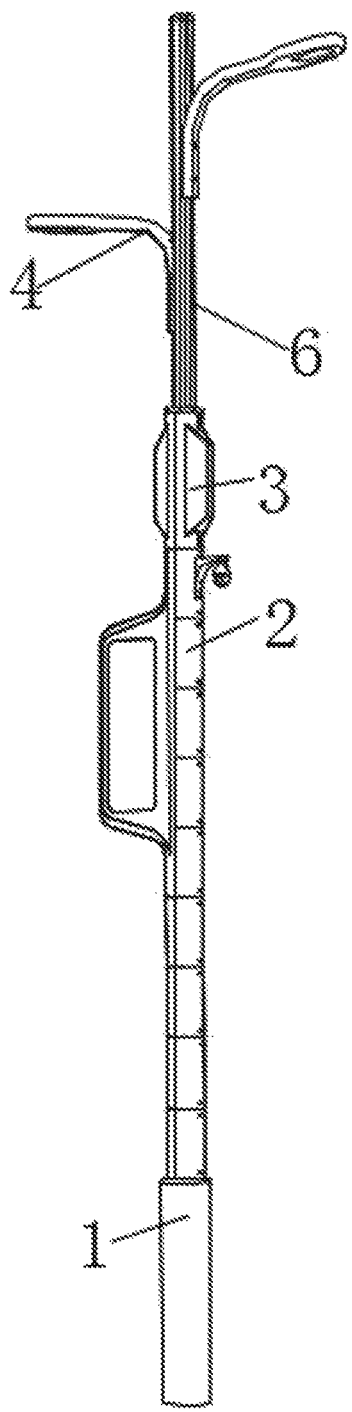
FIG. 1 is a schematic diagram of the overall structure according to the present disclosure.

In the FIGS. 1 to 14: 1—base, 2—module board, 3—function device, 4—lamp, 5—main pole, 51—mounting groove, 52—fixing member, 53—bolt, 54—threaded hole, 56—spring, 6—auxiliary pole, 7—preset interface, 71—end cover, 72—external portion, 73—inserting portion, 74—wire tube, 76—wire groove.

In the FIGS. 15 to 25: 01—light pole base; 02—control box module; 03—traffic warning sign module; 04—broadcast module; 05—connecting member; 051—snap ring; 052—seal pad; 053—mounting plate; 06—display module; 07—light pole; 08—camera module; 09—wind direction and wind speed detection module; 10—lamp head module; 11—adapter flange; 12—AP module; 13—fastening bolt; 14—T-shaped nut; 141—Nut post; 142—spring leaf; 143—screw; 144—nut seat; 15—preset interface; 151—end cover; 152—fixing seat; 153—waterproof pad; 154—strong electricity wire; 155—weak electricity wire; 16—isolation assembly; 161—wiring slot.

DETAILED DESCRIPTION OF THE EMBODIMENTS

The present disclosure will be further described below with reference to the accompanying drawings and embodiments, but not as a basis for limiting the present disclosure.

Embodiment 1 a modular assembled outdoor lighting device may include a base 1, a main pole 5, a lamp 4, a function device 3 and an auxiliary pole 6;

The auxiliary pole 6 may be fixedly connected to the top of the main pole 5. As shown in FIG. 1, the outer edge of the auxiliary pole 6 may be provided with at least one concave or convex mounting surface. In this embodiment, referring to FIG. 10, the cross section of the auxiliary pole 6 may be a "+" shape structure, and there can be four mounting surfaces provided on its outer side (ie. marked as 61 in the figure). The lamp 4 may be fixedly connected to the mounting surface.

The base 1 may be fixedly connected to the bottom of the main pole 5, and the base can play a role of fixing and embedding.

The inner chamber of the main pole 5 and the inner chamber of the auxiliary pole 6 are separated into two or more independent chambers mainly used for the arrangement of the electric wire compartment. They can be divided into strong electric wire compartment, weak electric wire compartment or others, in order to prevent mutual interference.

Figure 9:
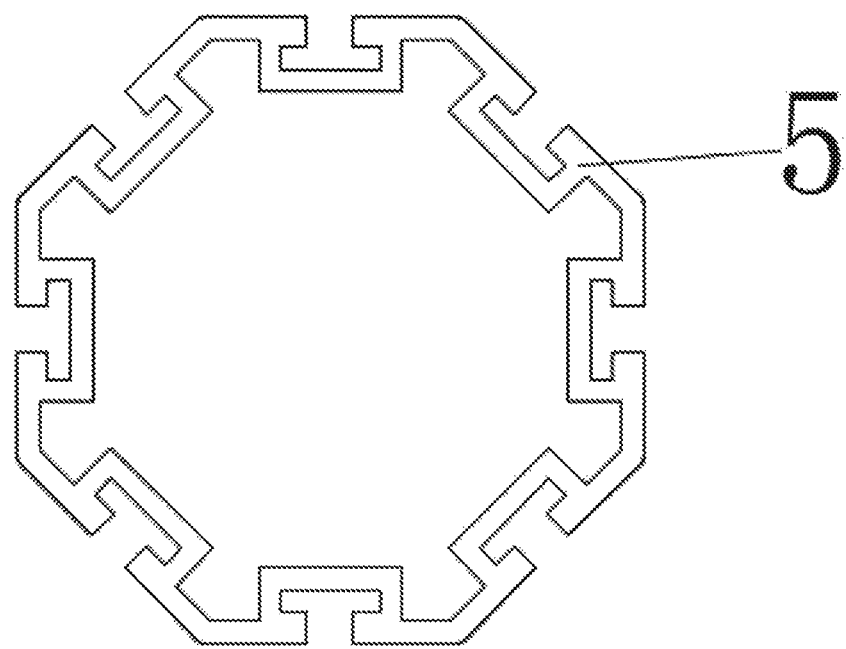
FIG. 9 is a schematic view of the structure of the main pole proposed in the embodiment according to the present disclosure.
Figure 10:
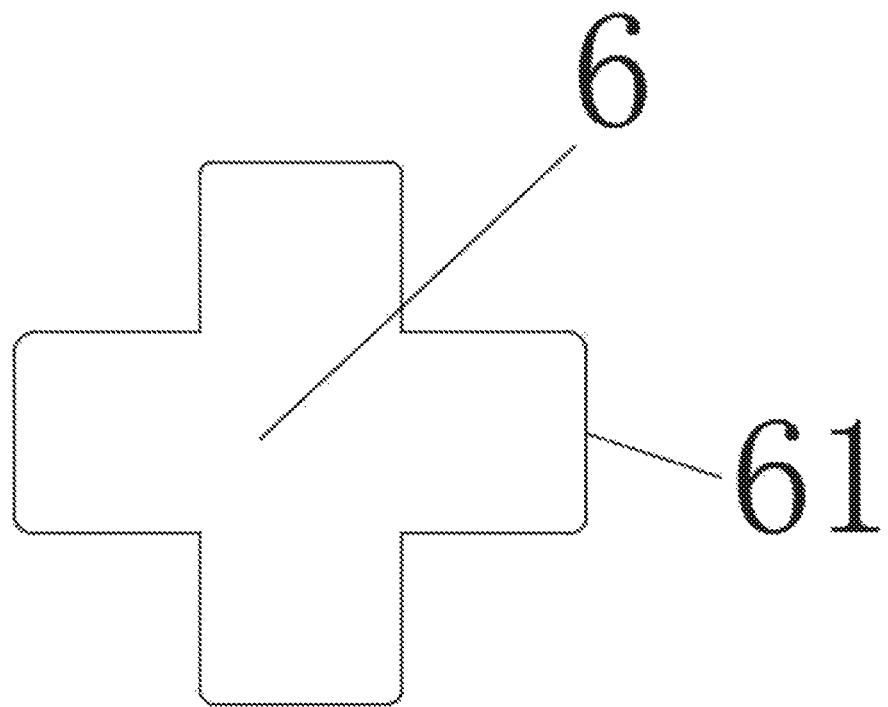
FIG. 10 is a cross-sectional view of an auxiliary pole in an embodiment according to the present disclosure.
Figure 11:
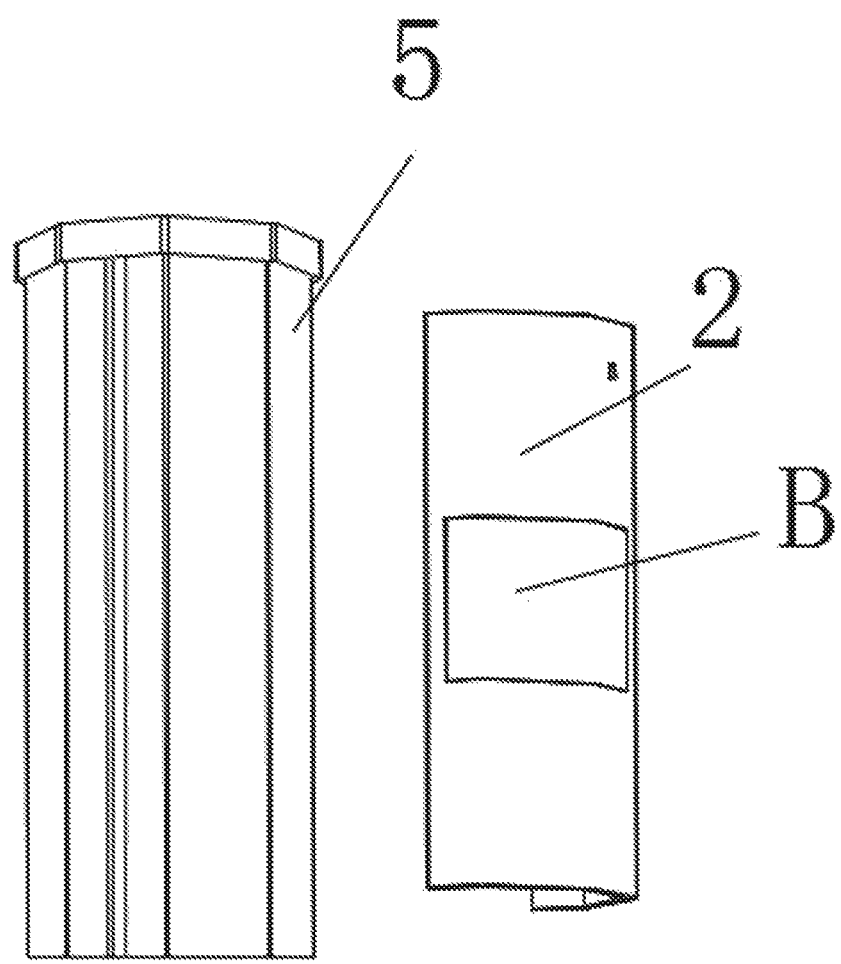
FIG. 11 is an installation diagram of a module board according to the present disclosure.

The cross section of the main pole 5 may be a polygonal structure selected from a group consisting of a regular octagon, a regular hexagon, and a square. At least one outer surface of the main pole 5 may be provided with a mounting groove 51. The shape selection of the main pole 5 depends on the actual environment and use requirements. For example, in an open environment, the main pole 5 may need to be equipped with a plurality of function devices 3 in multiple directions (for wind direction measurement, air humidity detection, etc.), then a hexagonal or an octagonal structure can be selected. Each of the surfaces can be used as a mounting surface with different angles. The mounting grooves 51 may be provided on the mounting surfaces. As shown in FIG. 9, the cross section of the mounting groove 51 may be a T-shaped structure.

Figure 3:
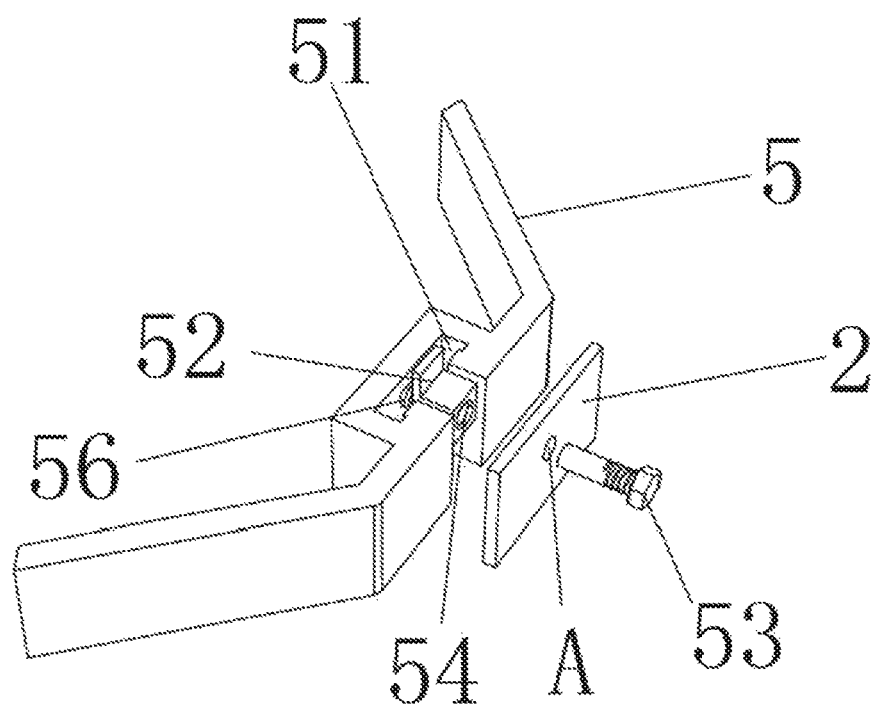
FIG. 3 is a schematic diagram of a installation structure of a fixing member according to the present disclosure
Figure 4:
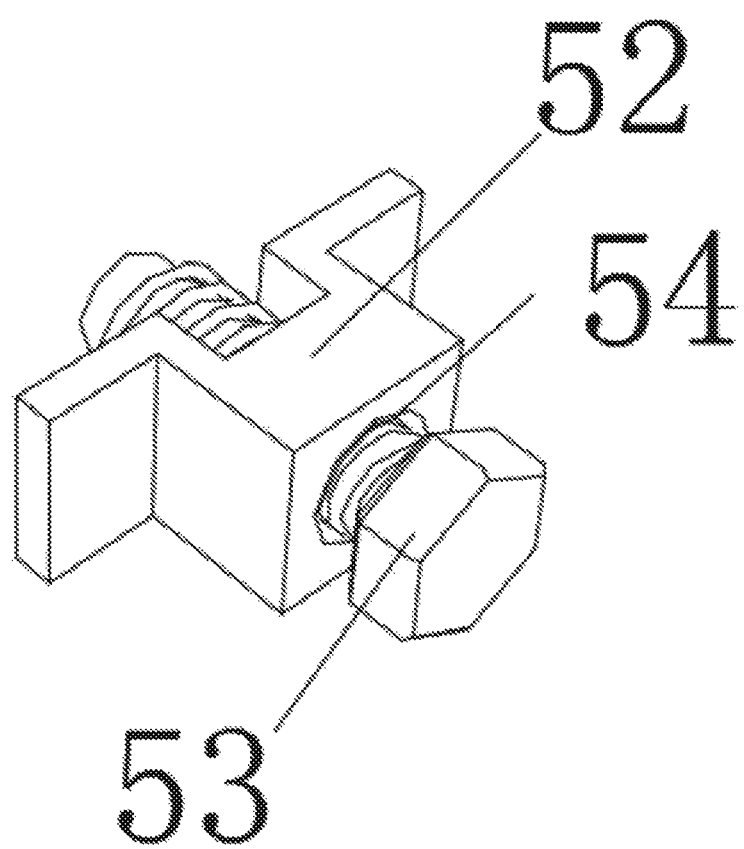
FIG. 4 is a perspective view of the structure of a fixing member according to the present disclosure.
Figure 5:
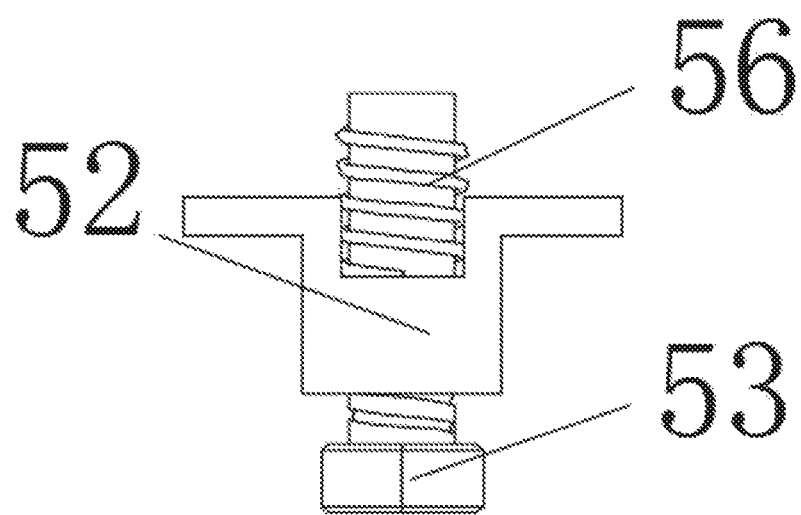
FIG. 5 is a plan view of the structure of the fixing member according to the present disclosure.

A fixing member 52 may be embedded in the mounting groove 51. Referring to FIGS. 3 and 4, the fixing seat 52 may be provided with the fixing member 52 protruded outwardly in a middle part, and a slot can be formed on an inner end surface of the fixing seat 52. A spring 56 can be embedded in the slot, and the compression direction of the spring 56 can be perpendicular to the end surface of the slot. A middle part of the fixing seat 52 may be provided with a threaded hole 54 aligned with the spring 56. It can be provided that the two sides of the fixing seat 52 are provided with limit plates.

The above-mentioned fixing member 52 can be preset in the mounting groove 51 in actual installation. The specific steps can be: turning one side of the spring 56 toward the mounting groove 51, and placing the limit plate parallel to the extending direction of the mounting groove 51, at last the fixing member 52 may be pressed into the mounting groove 51 until the spring is fully compressed; releasing the spring after rotating the fixing member 52 by 90 degrees, and the limit plate is squeezed by the spring 56 to tightly contact with the inner wall of the mounting groove 51. The fixing member 52 can be stably maintained at a specific position of the mounting groove 51 under the spring 56 and the action of the frictional force between the limit plate and the mounting groove 51.

In actual use, the fixing member 52 can be fixed to a specific position of the mounting groove 51 in advance, which facilitates the subsequent installation of the extension of the light pole.

Figure 6:
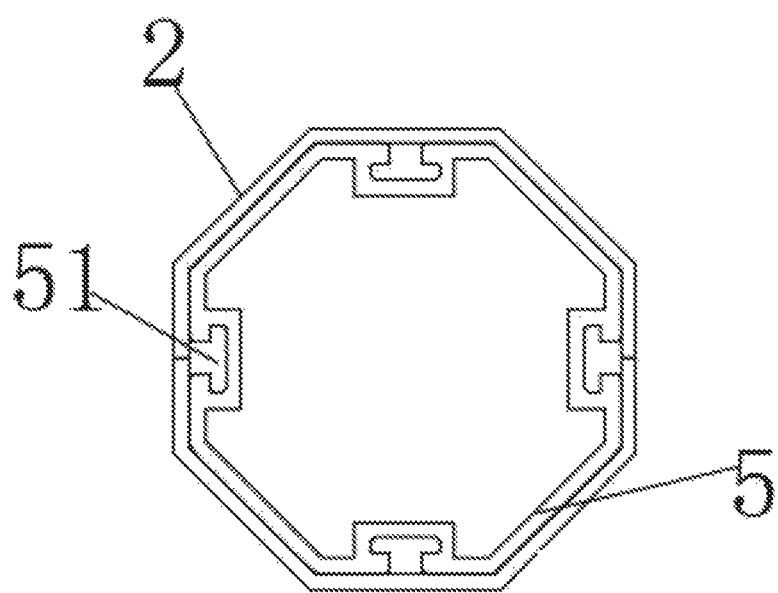
FIGS. 6 to 8 are schematic diagrams of the installation structure of module boards of different specifications according to the present disclosure.
Figure 7:
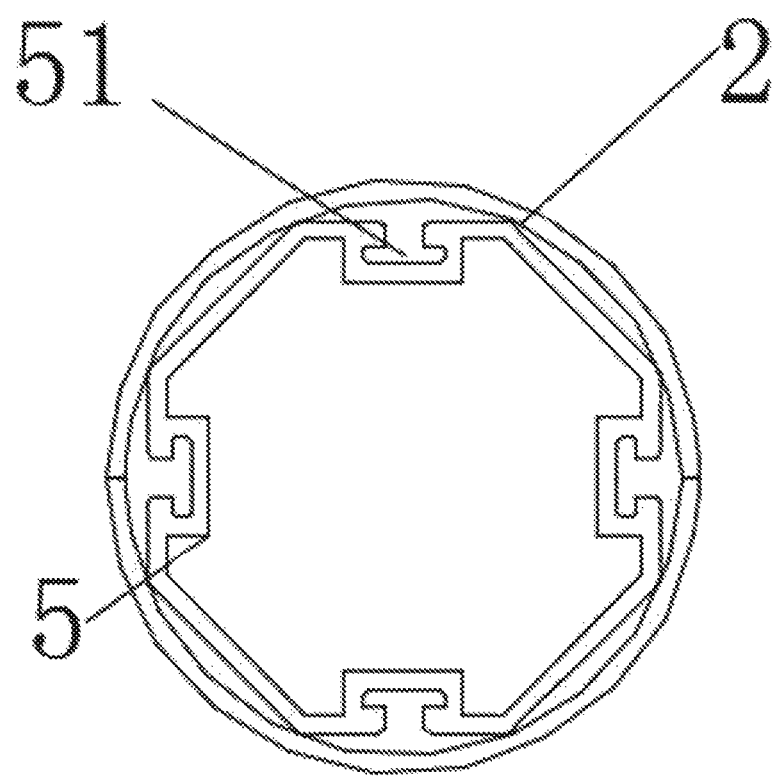
Figure 8:
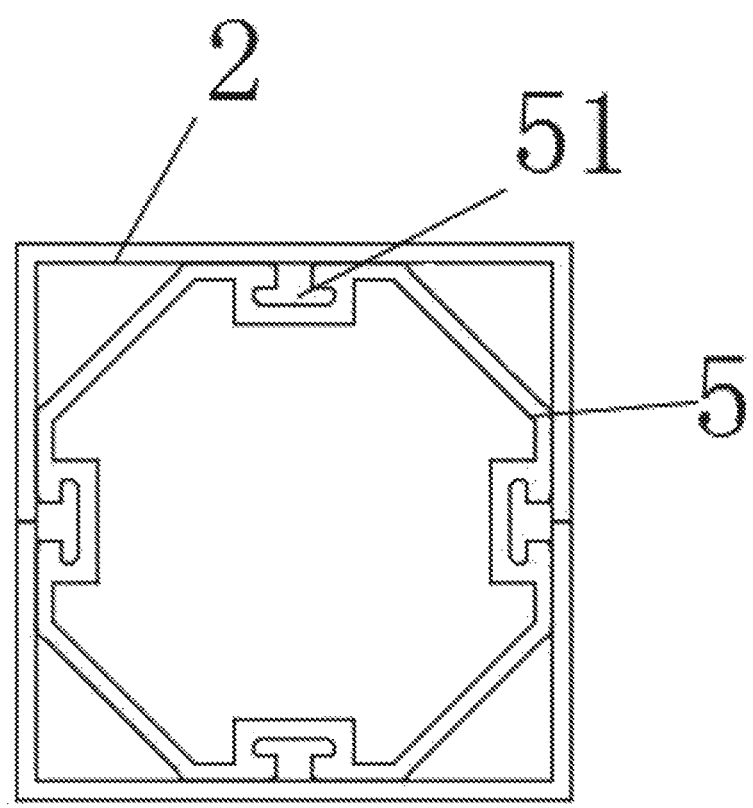

A module board 2 can be sleeved on the outer edge of the main pole 5. The cross-section of the module board 2 is a circular or a polygonal structure. The polygonal structure can be selected from a group consisting of a regular octagon, a regular hexagon, and a square, as seen in FIGS. 6 to 8 in detail.

In addition, the structure of the module board 2 may be not restricted by the main pole 5 under normal circumstances. The structure of the module board 2 depends on the device to be installed on it, such as the device to be installed is a device with a curved edge shape, and then a round module board 2 will be easier to install and fit with the device, with better stability. In addition, the shape of the module board 2 can also be selected according to the decoration needs.

The module board 2 can be composed of at least one daughter board and/or at least one mother board. In this embodiment, the combination of a daughter board and a mother board is selected. Referring to FIG. 6 for details, the daughter board and the mother board are spliced each other into the module board 2.

The module board 2 may be fixedly connected to the fixing member 52. In this embodiment, the daughter board connection and the mother board are connected, respectively, to the fixing member 52.

When connecting, a plurality of mounting holes are provided firstly in the daughter board and/or mother board, and then bolts 53 may be used to sequentially penetrate the module board 2, the threaded hole 54 and the spring 56, and the bolt 53 is threadedly connected to the threaded hole 54. The daughter board/mother board may be fixed on the mounting groove 51 under the action of the bolts, and the daughter board and the mother board may dock with each other (see FIG. 2). The installation is shown in FIG. 6.

The function device 3 may be fixedly connected to the main pole 5. The main pole 5 is the carrier of the function device 3, and there are two schemes for installing the function device 3.

Figure 12:
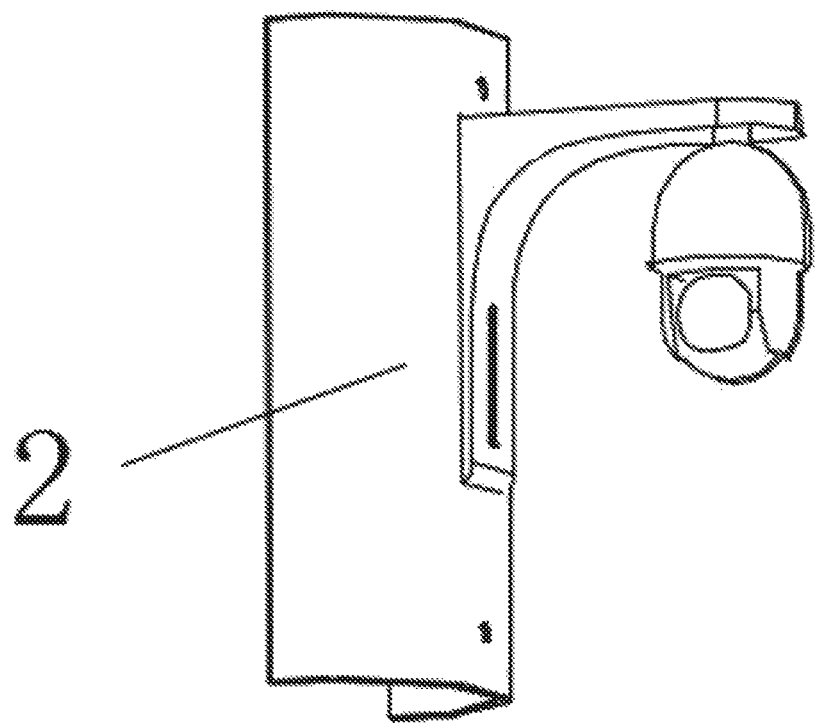
FIG. 12 is an installation diagram of a function device on a module board according to the present disclosure.
Figure 13:
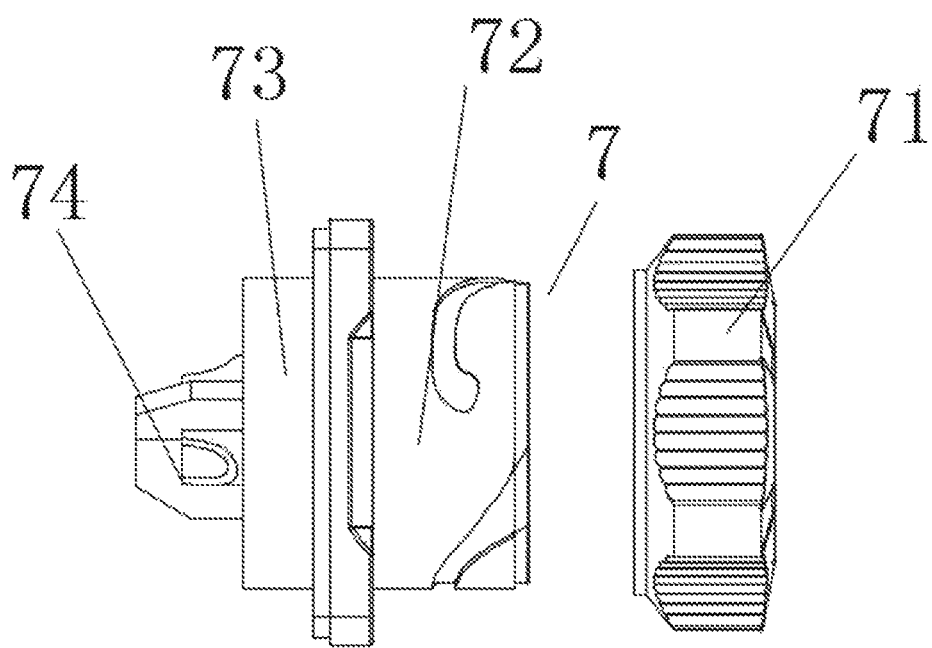
FIG. 13 is a structural diagram of a preset interface according to the present disclosure.

The one is to directly connect the function device 3 to the module board 2, with bolts or other mounting parts for fixing (as shown in FIG. 12).

The other one is to connect the function device 3 to the mounting groove 51. Referring to the position B in FIG. 11, firstly, a through hole in the module board 2 can be preset to pass through, the through hole is directly facing the mounting groove 51, and the function device 3 may be fixed on the mounting groove 51 by the fixing member 52, and the installation steps are as follows: using the bolt 53 to penetrate through the function device 3, the module board 2, the through hole and the spring 56 in order.

In addition, in this embodiment, a solution of a preset interface on the light pole is also proposed. The main structure of the preset interface can be referred to FIG. 13 and FIG. 14. The preset interface 7 may include an insertion portion 73, an external portion 72, and an end cover 71. The insertion portion 73 may be inserted into the main pole 5, and the outer wall of the insertion portion 73 may be sealedly connected to the main pole 5, and a sealing waterproof ring can be nested between the two.

A front end of the insertion portion 73 may be fixedly connected to a wire tube 74, and the wire tube is used for traction lines.

The external portion 72 may be fixedly connected to the rear end of the insertion portion 73, and threadedly connected to the end cover 7. The end cover 7 can play a role of sealing and waterproofing on the preset interface 7. When using this interface, it can be rotated down for easy operation.

A cavity can be provided in the external portion 72, and a wire groove 76 may be provided at the bottom of the cavity. The wire groove 76 can communicate with the wire tube 74. The cavity, the wire groove 76, and the wire tube 74 are for routing the line.

Figure 14:
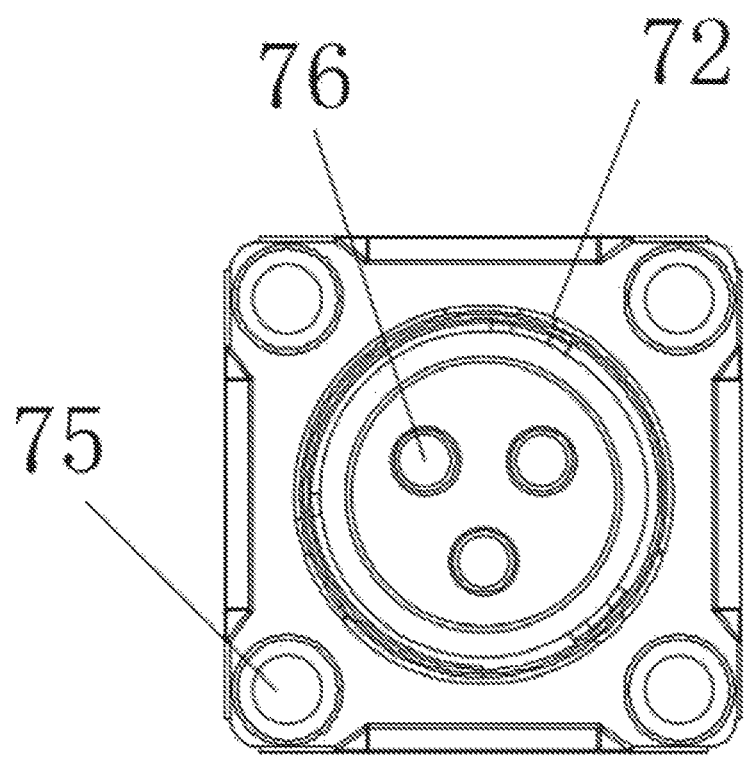
FIG. 14 is an installation structure diagram of a preset interface according to the present disclosure.

The preset interface has two functions:

a. it can be used as an installation interface alone, and the function device can be directly installed on the external portion 72. As shown in FIG. 14. The outer side wall of the external portion 72 may be provided with bolt fixing position 15, and the external portion 72 can also be used for fixed installation;

b. it is an interface used only for line connection and used in conjunction with the mounting position of the device.

In a word, it can be selectively installed according to the actual use. Similarly, the preset interface 7 can be fixed on the module board 2 or directly installed on the main body of the light pole. The installation of the preset interface 7 will not cause a burden on the main body of the light pole, nor will it affect the aesthetics of the light pole, and also help to improve the expandability of the light pole.

Figure 2:
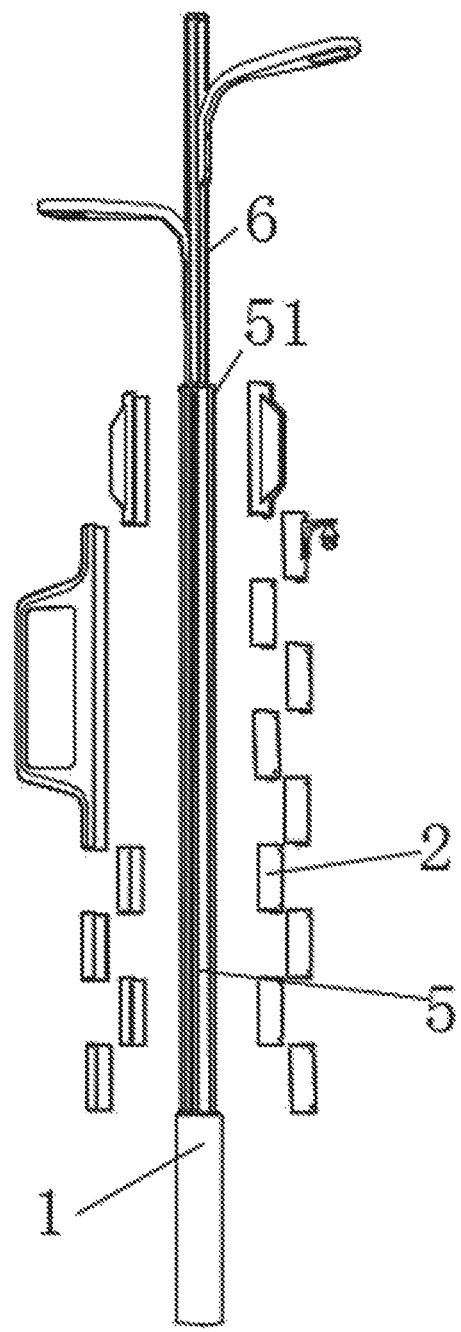
FIG. 2 is an exploded view according to the present disclosure.

It is worth mentioning that since the module board 2 is designed and installed in a modular layout, refer to FIG. 2 for details. In actual use, a certain module can be disassembled or maintained separately, and it is also the same for the replacement or maintenance of the function device, that is it only needs to be processed for a certain module board.

Embodiment 2

Figure 15:
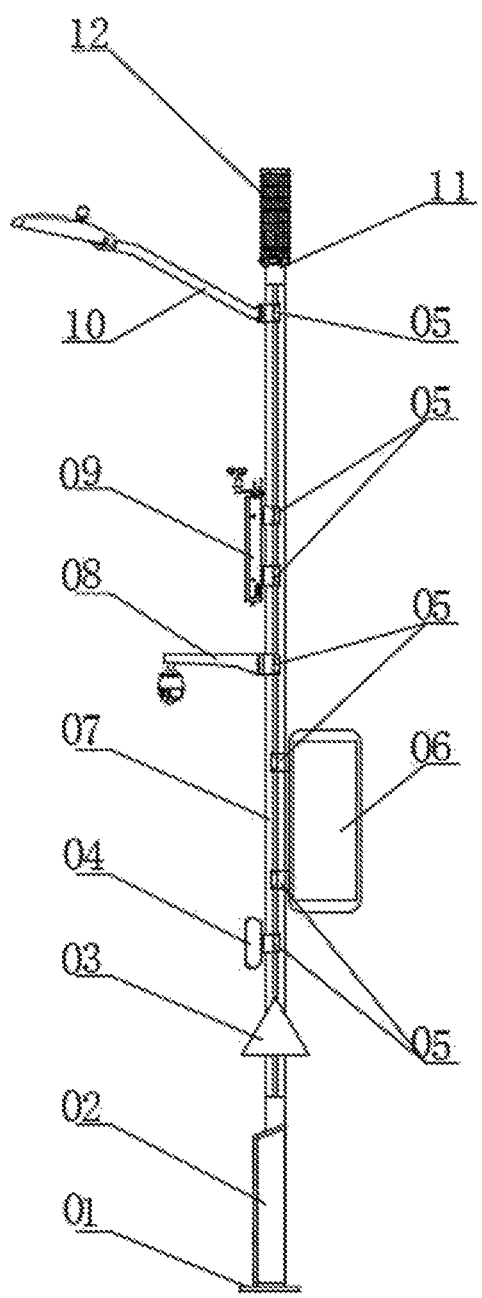
FIG. 15 is a schematic diagram of the overall structure of the light pole structure according to the present disclosure.

A snap slot type modular smart light pole structure may include a light pole base 01, a light pole 07, and a function module (or the function device 3). Referring to FIG. 15, the light pole base 01 may be located at the bottom of the light pole 07, and the light pole base 01 can be used for embedded installation.

Figure 16:
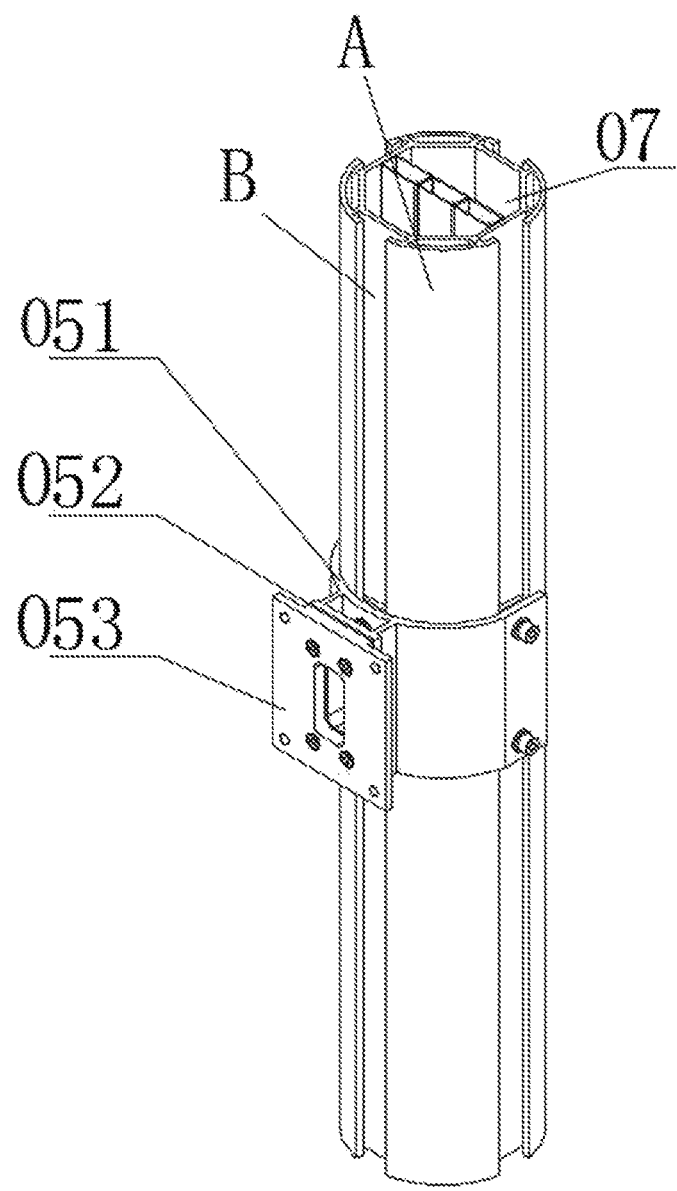
FIG. 16 is a schematic diagram of a connection structure between a light pole and a snap ring of the present disclosure.

Referring to FIG. 16, it can be known that the body of the light pole 07 is an octagonal tube structure (that is, the cross section is a regular octagon), and four arc-shaped plates protruding outward and extending to both sides may be provided on the side of the light pole 07 at intervals. (A in the figure), the arc-shaped plate and the light pole 07 may be an integrated structure. Each of the snap slot is formed between any two adjacent arc-shaped plates (B in the figure), that is, there are four snap slot on the light pole 07. As shown, the snap slot may be substantially surrounded by one side of the light pole 07 and two arc-shaped plates.

The installation of the light pole depends on the specific situation. This embodiment is a smart light pole, so the function modules are relatively complete. As shown in FIG. 15, the function module may include an AP module 12 (the bottom of the module is fixedly connected with an adapter flange 11, the bottom of the adapter flange 11 is fixedly connected with the top of the light pole 07); a lamp head module 10; a wind direction and wind speed detection module 09, a camera module 08, a display module 06, a broadcast module 04, a traffic warning sign module 03, and a control box module 02.

Figure 17:
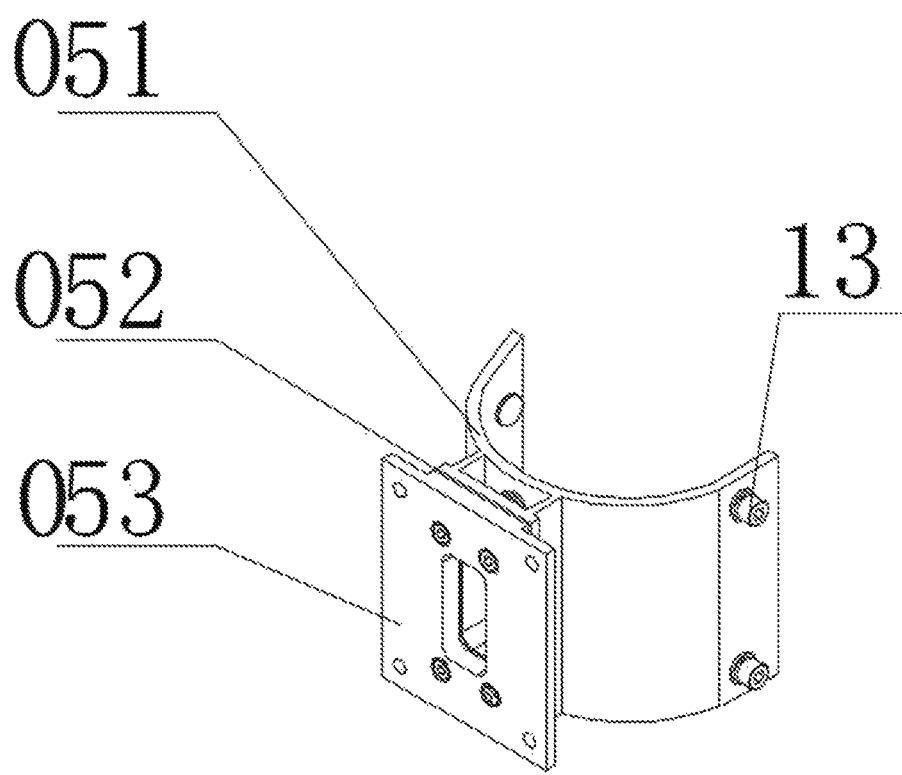
FIG. 17 is a schematic diagram of the structure of the snap ring of the present disclosure.

Referring to FIG. 15, the function module located on the side of the light pole 07 and the light pole 07 may be connected through connecting member 05 for fixed installation. The connecting member 05 may include a snap ring 051 and a mounting plate 053. As shown in FIG. 17, the cross section of the snap ring 051 is a semi-circular structure. The mounting plate 053 is fixed to the middle of the snap ring 051, and a seal pad 052 is embedded at a joint between the mounting plate 053 and the snap ring 051. The main function of the seal pad 052 is waterproof. In addition, the seal pad 052 may be made of an elastic material, so it can alleviate the stress between the interconnecting structures, thereby having the function of improving stability.

Figure 18:
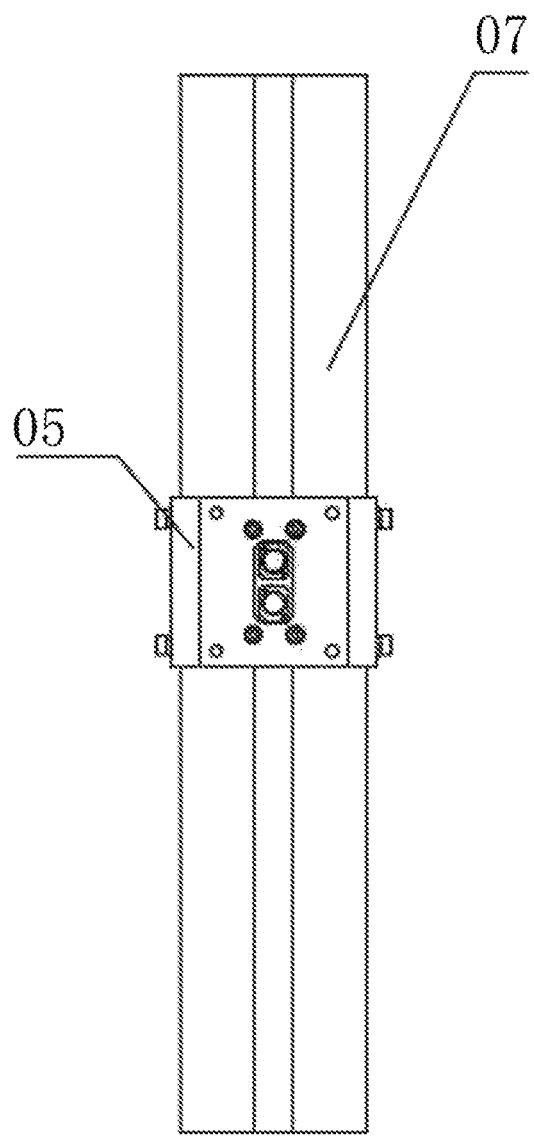
FIG. 18 is a front view of a mounting position on a light pole of the present disclosure.
Figure 19:
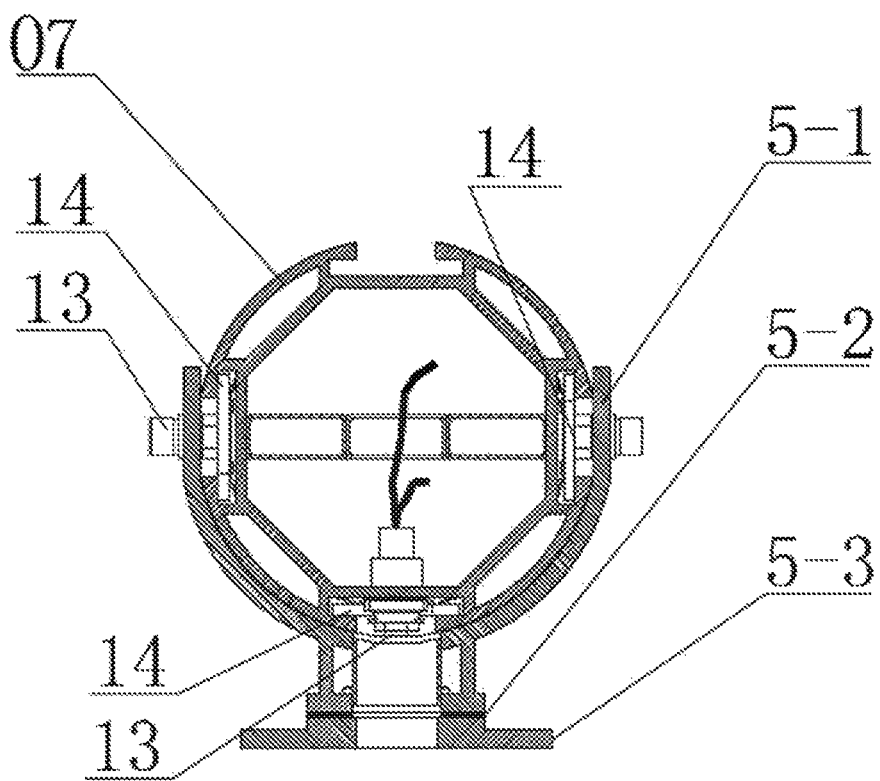
FIG. 19 is a cross-sectional structural view of a connection structure between a snap ring and a light pole according to the present disclosure.

During installation, referring to FIG. 16, FIG. 18, and FIG. 19, the snap ring 051 may be first sleeved on the side wall of the light pole 07. At this time, the snap ring 051 can cover three adjacent snap slots (the mounting plate 053 and the snap slots in the middle correspond to each other and are parallel). In addition, a T-shaped nut 14 may be additionally provided between the snap ring 051 and the snap slot.

Figure 22:
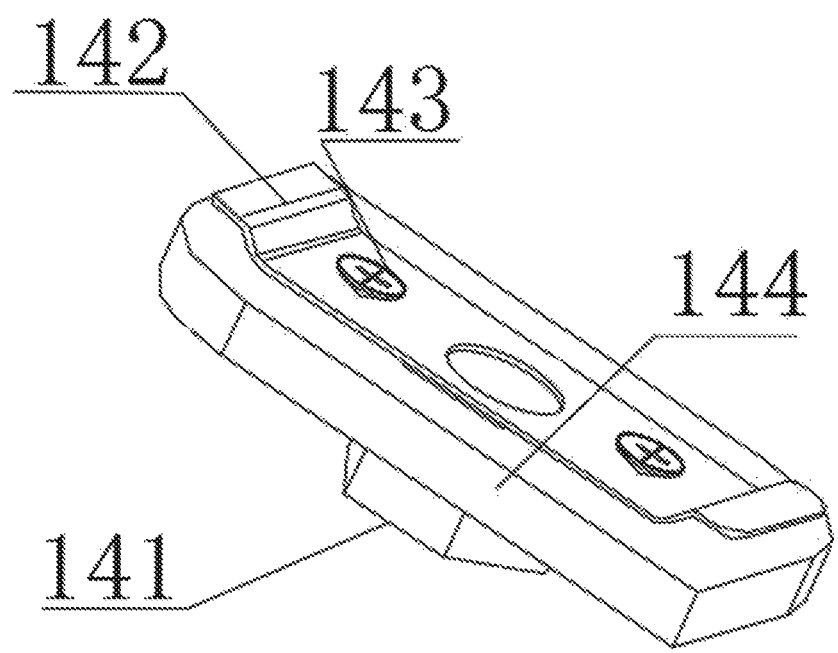
FIG. 22 is a structural schematic view of a T-shaped nut of the present disclosure.
Figure 23:
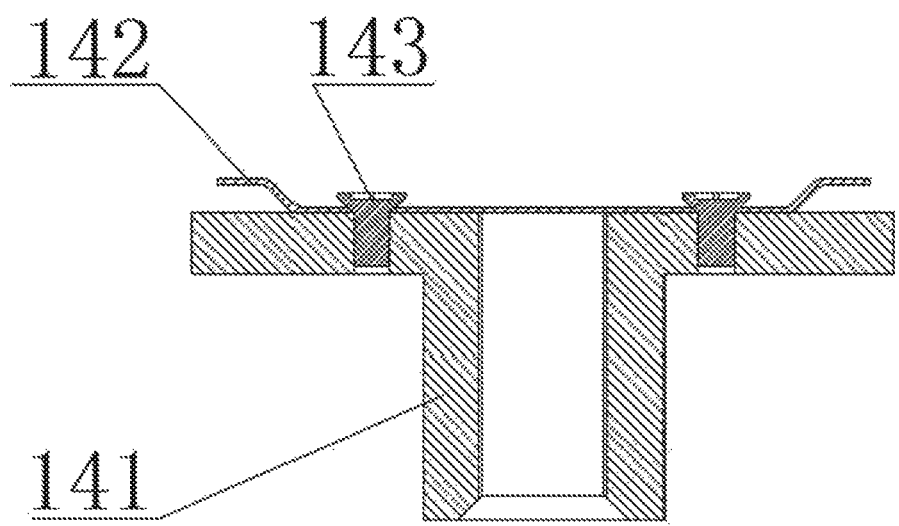
FIG. 23 is a vertical sectional view of a T-shaped nut of the present disclosure.
Figure 24:
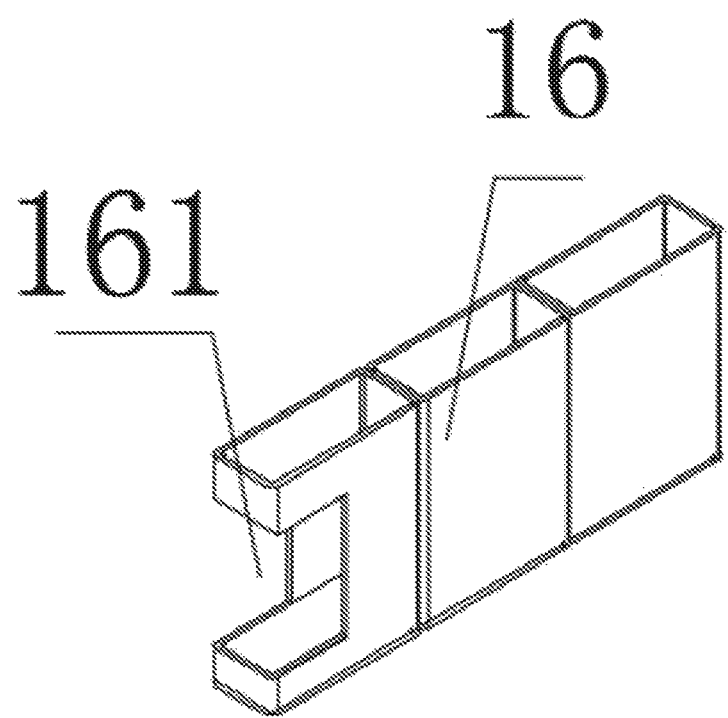
FIG. 24 is a schematic structural diagram of an isolation module (installation state 1) of the present disclosure.
Figure 25:
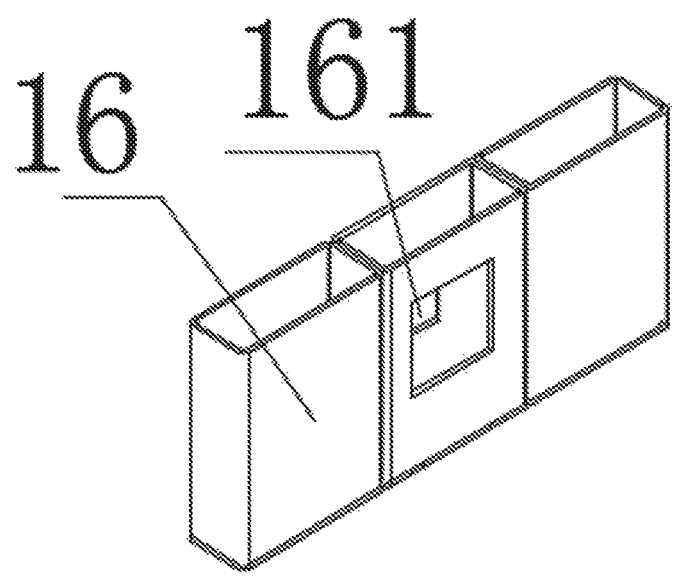
FIG. 25 is a schematic structural diagram of an isolation module (installation state 2) of the present disclosure.

Referring to FIG. 19, the T-shaped nut can be located at three joints of the snap slots and the snap ring 051 (the three reference numerals 14 in FIG. 19 are specific positions). The specific structure of the T-shaped nut 14 is shown in FIGS. 22 and 23. It may include a nut post 141 and a nut seat 144. The nut post 141 may be fixedly connected to one end surface of the nut seat 144, and the nut post 141 and the nut seat 144 may be an integrated structure. A spring leaf 142 may be fixed on the nut seat 144 on the end surface facing away from the nut post 141 by a screw 143. The middle portion of the spring leaf 142 may be a flat plate structure parallel to the nut seat 141, and both ends of the spring leaf 142 can be connected with leafs outwardly protruded. The spring leaf can be made of spring steel material, and the whole of the spring leaf 142 may be a "U" structure.

The nut seat 144 may be a rectangular structure. The edge of the nut seat 144 may be provided with at least one arc chamfers. In one embodiment, two arc chamfers are provided, and the arc chamfers may be located on the opposite corner of the nut seat 144, as shown in FIG. 22. The nut seat 144 may have four corners, and the chamfers may be provided on two opposite corners of the four, and the other two corners are not chamfered.

In specific installation, at first, the T-shaped nut 14 may be placed into the snap slot vertically. When placing, the nut seat 144 is parallel to the inner side of the snap slot, and the spring leaf 142 contacts the inner side of the snap slot. The spring leaf 142 and the nut seat 144 are rotated 90 degrees clockwise. If the height in this process needs to be adjusted, the spring leaf 142 can be pressed slightly and slided up and down to reach a proper position. At this point, the preset of the T-shaped nut is completed, and the last thing to do is to combine the T-shaped nut with the retaining ring 051. A threaded hole can be provided in the middle of the snap ring 051, the threaded hole may be docked with the nut post 141, and at last, a fastening bolt 13 may be selected to be inserted through the nut post 141 and locked. In addition, two ends of the snap ring 051 may be also fixed in the same way (the specific mounting structure can be directly seen from FIGS. 19 and 17). When the limit bolt is tightened, the force between the threads will cause the nut to rotate as a whole. When the sharp corner of the nut seat that has not been chamfered touches the inner wall of the slot, it can be prevented from continuing to rotate and may play a limit effect.

It is noted that in the connection structure between the snap ring 051 and the light pole 07 above, there are several connection surfaces (for example, in direct contact with two arc-shaped plates A, or direct contact with the snap slot via the spring leaf 142 on the T-shaped nut 14), and there are several connection points (that is, the connection structure of bolts). The connection structure is stable and durable. And in the early installation stage, it can be preset by the T-shaped nut 14, which makes the operation more convenient during installation.

After the snap ring 051 is installed, the function module can be mounted separately by the snap ring 051. When the installation size of the function module and the snap ring are difficult to match, the assembly can be carried out through the mounting plate 053.

The foregoing content is the specific mounting structure on the light pole 07. The installation of function modules also involves wiring issues. Compared with this type of lamps, it is convenient, mainly involving the installation of strong and weak wires.

Figure 21:
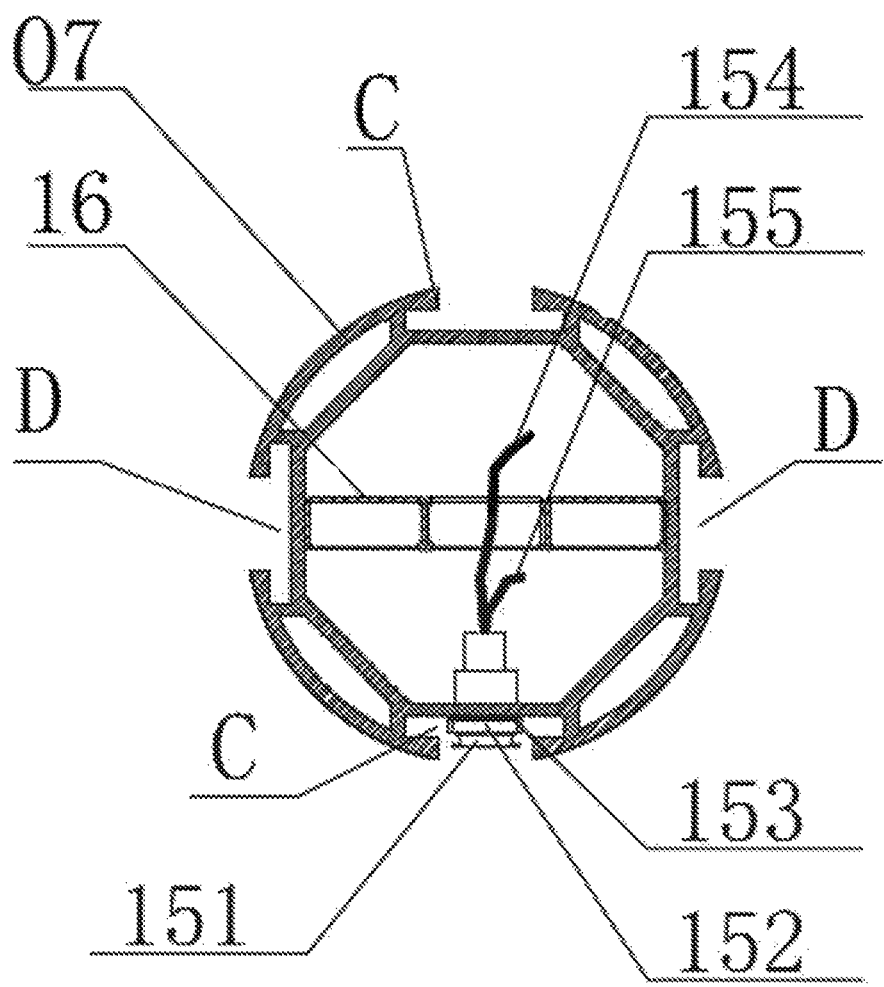
FIG. 21 is a structural schematic diagram of a compartment in a lamp post of the present disclosure.

Referring to FIG. 16 and FIG. 21, an isolation assembly 16 may be provided in the inner cavity of the light pole 07 in this embodiment. The isolation assembly 16 may be composed of three rectangular tubes welded in sequence. In specific implementation, three rectangular tubes can be intermittently welded into a whole to form an isolation assembly 16, and then inserted into the inner cavity of the light pole 07, and the isolation assembly 16 may be welded and fixed at the positions of the two ports.

After the isolation assembly 16 is installed, the inner cavity of the light pole 07 can be divided into two independent chambers, which are defined as a strong electricity compartment and a weak electricity compartment (as shown in FIG. 21). A strong electric wire 155 is installed in the strong electricity compartment, and a weak electric wire 154 is installed in the weak electricity compartment.

It is noted that the purpose of selecting rectangular tubes without directly selecting other profiles is that: smart light poles or comprehensive traffic poles are generally more than 6 m, and the diameter ranges from 140 to 300 mm. In order to divide compartments in such a thin and narrow space, the structure needs to ensure high straightness. Ordinary separators cannot meet this requirement with existing processes. Therefore, this kind of tubes can be selected. The rectangular tube not only has many specifications and high straightness, but also minimizes the space structure occupying the interior of the lamp pole, which is convenient for threading.

The purpose of choosing three rectangular tubes instead of one is that: some smart light poles or traffic comprehensive poles at the intersection may load the equipment in multiple directions (and the light pole 07 here can theoretically be loaded in four directions), in order to facilitate leading out wires, and also to ensure the overall flatness and straightness during welding. In addition, the use of multiple rectangular tubes with small specifications and narrow widths can also reduce their space occupancy.

The purpose of dividing the light poles 07 is to ensure that the internal wiring of the light poles is neat and tidy to facilitate later maintenance. At the same time, it will eliminate the hidden danger of electromagnetic interference and solve the problem of unstable signal and abnormal system of traditional wiring.

After the light pole 07 is divided, since the isolation assembly 16 is an integrated structure, it is necessary to consider the specific wiring to open a wiring slot 161 on the isolation assembly 16. The wiring method is essentially determined according to the mounting position of the function module. Referring to FIG. 21, there are specifically four positions on the light pole 07 where function modules can be installed. The four mounting positions can be divided into two groups with reference to the position of the isolation assembly 16. One group may be parallel to the isolation assembly 16 (defined as mounting position C), and one group may be perpendicular to the isolation assembly 16 (defined as mounting position D), as shown in FIG. 21.

It can be seen from FIG. 21 that if the wiring is performed for the function module at the mounting position C, a wiring slot 161 needs to be opened in the middle of the isolation module 16 (that is, opened at a square pipe in the middle). For the specific structure, FIG. 25 can be referred to.

If the wiring is performed for the function module at the mounting position D, a wiring slot 161 needs to be opened on the side of the isolation assembly 16 near the function module. For the specific structure, FIG. 24 can be referred to.

It is noted that the installation and slotting of the isolation module 16 (mainly the wiring slot 161) can be planned at the production stage. That is, first determine the installation of the function modules on the light pole, and then customize or mass produce the installation structure. This will make it quicker and easier in subsequent installations.

Figure 20:
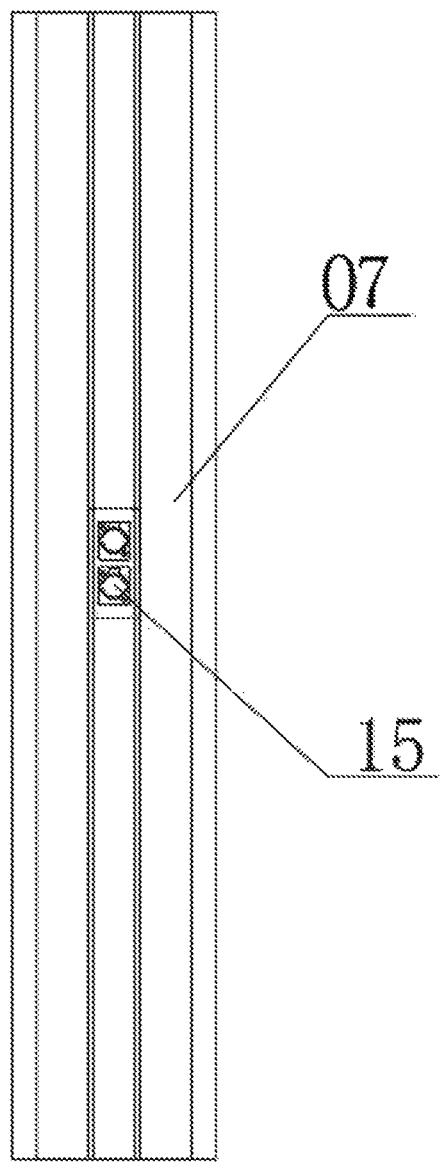
FIG. 20 is a schematic structural diagram of a preset interface on a light pole of the present disclosure.

In specific line installation, a preset interface 15 needs to be added to a preset mounting position (refer to FIG. 20). The preset interface 15 may include a connecting pipe, a fixing seat 152 and an end cover 151, and the connecting pipe may run through the outer side wall of the light pole 07 (strong/weak wires enter the preset interface 15 through the connecting pipe). The fixing seat 152 may be connected to the outside of the connecting pipe, and a waterproof pad 153 may be embedded between the fixing seat 152 and the outer side wall of the light pole 07. The fixing seat 152 may be a hollow structure (strong/weak wires can pass through the connecting pipe and the fixing seat 152 in order to connect with the external function module). The front end of the fixing seat 152 can be sleeved with the end cover 151. Both the end cover 151 and the waterproof pad 153 play a waterproof role. If a function module is actually installed, the end cover 151 can be removed and then the line connection can be performed. If it is only used as a preset mounting position (that is, the equipment does not need to be installed immediately and reserved for later equipment addition), then the end cover 151 and the waterproof pad 153 can play a good waterproof role. The operation of the internal circuit cannot be affected even if the mounting position is reserved.

In actual application, according to the distinction between strong and weak wires, two preset interfaces 15 can be provided, which are arranged up and down. It is also noted that the T-shaped nut 14 described above may be located between the two preset interfaces 15 in actual installation, and can play a fixing role on the snap ring 051.

The snap ring 051 also needs to have a connection port at a corresponding position connected to the preset interface 15 for line connection. Here is an example: referring to FIG. 15, FIG. 19 and FIG. 21, when installing the lamp head module 10, first the strong electricity wire 154 inside the lamp post 07 can be led out from the wiring slot 161 and sent into the upper preset interface 15. and finally pulled out from the port of the fixing seat 152; then, the weak electricity wire 153 can be directly introduced into the preset interface 15 and may be pulled from the port of the fixing seat 152; after the strong and weak electricity wires are drawn out, they can be connected to the lamp head module 10. At final, the fixed connection between the lamp head module 10 and the snap ring 51 can be completed.

The invention claimed is:

1. A modular assembled outdoor lighting device, wherein comprising: a main pole and a function device, the main pole is provided with a mounting groove on at least one outer surface; a fixing member embedded in the mounting groove; and a module board provided on an outer edge of the main pole, the module board comprises at least one daughter board and/or at least one mother board, the module board is fixedly connected to the fixing member, the function device is fixedly connected to the main pole, and the module board and/or the main pole is embedded with a preset interface portion;

wherein a cross section of the mounting groove is a T-shaped structure, and the fixing member is provided with a fixing seat externally protruded at a middle portion of the fixing member; the fixing seat is provided with a slot on an inner end surface, and a spring is embedded in the slot, and a compression direction of the spring is perpendicular to the end surface of the slot, and a threaded hole is provided at middle of the fixing seat, the threaded hole is aligned with the spring, the fixing seat is provided with limit plates at both sides.

2. The modular assembled outdoor lighting device according to claim 1, wherein, further comprises an auxiliary pole fixedly connected to a top of the main pole, and the auxiliary pole is provided with at least one concave or convex mounting surface at its outer edge; the auxiliary pole is installed with a lamp, and the main pole is fixedly connected with a base at its bottom.

3. The modular assembled outdoor lighting device according to claim 1, wherein a cross section of the main pole is a polygonal structure, and the polygonal structure is selected from a group consisting of a regular octagon, a regular hexagon and a square, inner chambers of the main pole and an auxiliary pole are isolated to form two or more independent chambers.

4. The modular assembled outdoor lighting device according to claim 3, wherein a cross section of the module board is a circular or a polygonal structure, and the polygonal structure is selected from a group consisting of a regular octagon, a regular hexagon, and a square.

5. The modular assembled outdoor lighting device according to claim 1, wherein the fixing member comprises a bolt, and the bolt sequentially penetrates the module board, the threaded hole and the spring, and the bolt is threadedly connected to the threaded hole.

6. The modular assembled outdoor lighting device according to claim 1, wherein the function device comprises a wind direction and speed detection device, a camera device, a display device, a broadcast device, a traffic warning sign device and a control box device, the function device is fixedly connected to a module board or to the fixing member.

7. The modular assembled outdoor lighting device according to claim 1, wherein the preset interface portion comprises an insertion portion, an external portion, and an end cover, the inserting portion is inserted into the main pole, an outer wall of the inserting portion is sealedly connected to the main pole, the front end of the inserting portion is fixedly connected to a wire tube, the external portion is fixedly connected to a rear end of the insertion portion, the external portion is threadedly connected to the end cover, the external portion is provided with a cavity provided with a wire groove at a bottom of the cavity, the wire groove is in communication with the wire tube.

8. A method for installing a modular assembled outdoor lighting device according to any one of claim 1, wherein comprising a step of installing the lamp and a step of reservation of the fixing member, a step of installation of the module board, and a step of installation of the function device;

the step of installation of the lamp comprises:

determining an installation direction and an installation height firstly;

selecting a suitable auxiliary pole and a specific installation surface;

installing the lamp on the installation surface by means of bolts;

the step of reservation of fixing member comprises:

determining an installation plan firstly, and marking in advance at the position to be installed;

pressing the fixing member at the marked position, and the step of pressing the fixing member is:

placing one side of a spring toward the mounting groove, and placing the limit plate parallel to the extending direction of the mounting groove, and finally pressing the fixing member into the mounting groove until the spring is fully compressed; releasing the spring after rotating the fixing member by 90 degrees, and the limit plate is pressed by the spring to tightly adhere to the inner wall of the mounting groove;

at this time, the fixing member is reserved at a fixed position, and the fixed position is the installation interface;

the step of installation of module board is:

providing with a fixing hole on the end surface of the module board before installing the module board;

connecting the module board to the fixing member;

passing the bolts sequentially through the module board, the threaded hole and the spring, and tightening them;

the step of installation of the function device:

connecting the function device directly to the module board.

9. The method for installing a modular assembled outdoor lighting device according to claim 8, wherein: the step of installing the function device further is: firstly presetting a through port on the module board, the through port is directly opposite the mounting groove, and then fixing the function device to the mounting groove by using a fixing member.

10. A snap slot type modular smart light pole structure, wherein comprising a light pole and a function module, the light pole and the function module are fixedly connected through a connecting member; the light pole and the connecting member are fixedly connected by a T-shaped nut provided with an elastic member; and the light pole is provided with an isolation assembly, the light pole is separated by the isolation assembly into an independent chamber; the light pole is provided with a preset interface portion on a side wall, the preset interface portion is provided with a waterproof pad connected with the connecting member;

wherein the connecting member comprises a snap ring and a mounting plate, the snap ring has a cross-section of a semi-circular structure, the mounting plate is fixedly installed at middle of the snap ring, a joint between the mounting plate and the snap ring is embedded with a seal pad.

11. The snap slot type modular smart light pole structure according to claim 10, wherein the function module comprises an AP module, a lamp head module, and a wind direction and wind speed detection module, a camera module, a display module, a broadcast module, a traffic warning sign module and a control box module.

12. The snap slot type modular smart light pole structure according to claim 10, wherein a body of the light pole is an octagonal tube structure, and the light pole is provided with four arc-shaped plates protruding outward and extending to both sides at intervals at a side, the arc-shaped plates and the light pole are integrated, and at least one snap slot is formed between adjacent two of the arc-shaped plates.

13. The snap slot type modular smart light pole structure according to claim 10, wherein the T-shaped nut comprises a nut post and a nut seat, and the nut post is fixedly connected to one end surface of the nut seat, the nut post and the nut seat are integrated, the elastic member is a spring leaf fixed on the nut seat on the end surface facing away from the nut post by a screw.

14. The snap slot type modular smart light pole structure according to claim 13, wherein the nut seat is a rectangular structure, and the nut seat is provided with two arc chamfers located on opposite corners of the nut seat.

15. The snap slot type modular smart light pole structure according to claim 10, wherein the isolation assembly comprises three rectangular tubes welded in sequence, and the isolation assembly is provided with a wiring slot.

16. The snap slot type modular smart light pole structure according to claim 10, wherein the preset interface portion comprises a connecting pipe, a fixing seat, and an end cover; the connecting pipe penetrates an outer side wall of the light pole, the fixing seat is connected to an outside of the connecting pipe, and a waterproof pad is embedded between the fixing seat and the outer side wall of the light pole.

* * * * *